United States Patent
Chini et al.

(10) Patent No.: US 10,352,221 B2
(45) Date of Patent: Jul. 16, 2019

(54) HEATING DEVICE AND TANK WITH HEATING DEVICE

(71) Applicant: Röchling Automotive SE & Co. KG, Mannheim (DE)

(72) Inventors: Fabrizio Chini, Isera (IT); Luca Marini, Besenello (IT); Ivan De Metri, Bolzano (IT); Francesca Brunori, Laives (IT); Stefano Dalpez, Male (IT)

(73) Assignee: RÖCHLING AUTOMOTIVE SE & CO. KG, Mannheim (DE)

( * ) Notice: Subject to any disclaimer, the term of this patent is extended or adjusted under 35 U.S.C. 154(b) by 0 days.

(21) Appl. No.: 15/445,069

(22) Filed: Feb. 28, 2017

(65) Prior Publication Data
US 2017/0254247 A1    Sep. 7, 2017

(30) Foreign Application Priority Data
Mar. 3, 2016  (DE) .................. 10 2016 203 495

(51) Int. Cl.
| | |
|---|---|
| *F01N 3/28* | (2006.01) |
| *F01N 3/20* | (2006.01) |
| *H05B 3/16* | (2006.01) |
| *H05B 3/18* | (2006.01) |
| *H05B 3/26* | (2006.01) |
| *H05B 3/28* | (2006.01) |

(Continued)

(52) U.S. Cl.
CPC ......... *F01N 3/2896* (2013.01); *F01N 3/2066* (2013.01); *H05B 1/0236* (2013.01); *H05B 3/16* (2013.01); *H05B 3/18* (2013.01); *H05B 3/26* (2013.01); *H05B 3/28* (2013.01); *H05B 3/78* (2013.01); *F01N 2610/02* (2013.01); *F01N 2610/10* (2013.01); *F01N 2610/1406* (2013.01); *Y02A 50/2325* (2018.01); *Y02T 10/24* (2013.01)

(58) Field of Classification Search
CPC ............... F01N 3/2066; F01N 2610/02; F01N 2610/10; F01N 2610/1406; H05B 3/16; H05B 3/18; H05B 3/26; H05B 3/267; H05B 3/28; H05B 3/286
See application file for complete search history.

(56) References Cited

U.S. PATENT DOCUMENTS

| | | | |
|---|---|---|---|
| 2008/0210048 A1* | 9/2008 | Yoneyama | B62D 1/065 74/552 |
| 2010/0213189 A1* | 8/2010 | Keite-Telgenbuescher | B60R 1/0602 219/548 |

FOREIGN PATENT DOCUMENTS

WO    WO 2009106373 A1 *  9/2009  ........... F01N 3/2066

* cited by examiner

*Primary Examiner* — Audrey K Bradley
(74) *Attorney, Agent, or Firm* — Prince Lobel Tye LLP

(57) ABSTRACT

Heating device (10), in particular for heating an operating fluid tank of a motor vehicle, preferably a tank for storage of aqueous urea solution, the heating device (10) comprising an electrical resistance heating trace (14) with a heating side (14b), on which, in intended operation, heat is emitted to a fluid to be heated, and the heating side (14b) opposing a carrier side (14a), on which the resistance heating trace (14) faces a mounting supporting it, wherein the resistance heating trace (14) is disposed between a flexible film (16) on its heating side (14b) and a substrate (12), rigid in comparison with the flexible film (16), as the supporting mounting on the carrier side (14a), which is characterized in that the resistance heating trace (14a) is connected to the rigid substrate (12) on the carrier side (14a) without intermediate arrangement of a further film.

23 Claims, 3 Drawing Sheets

Figure 1:
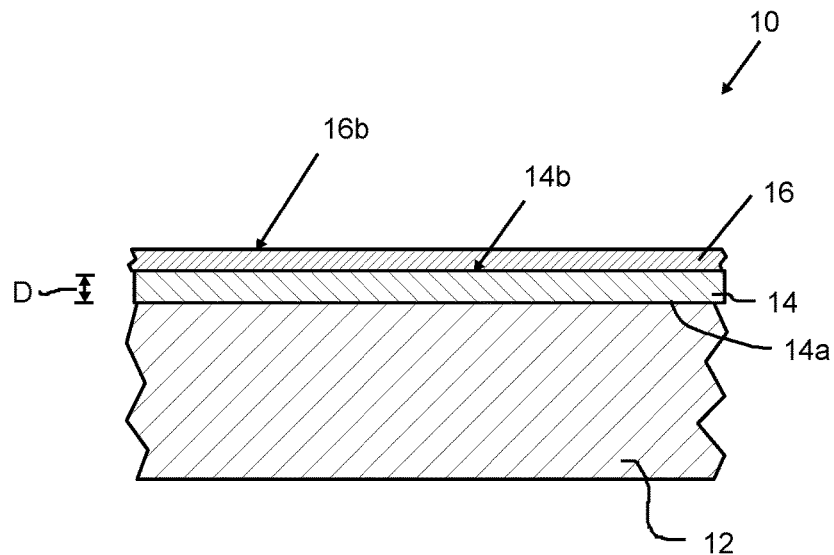

(51) Int. Cl.
*H05B 3/78* (2006.01)
*H05B 1/02* (2006.01)

HEATING DEVICE AND TANK WITH HEATING DEVICE

CROSS REFERENCE TO RELATED APPLICATION(S)

This application claims priority to German Application No. 10 2016 203 495.2, filed Mar. 3, 2016. The entirety of the disclosure of the above-referenced application is incorporated herein by reference.

BACKGROUND OF THE INVENTION

Field of the Invention

The present invention relates to a heating device, such as is used in particular for heating an operating fluid tank in a motor vehicle, wherein a motor-vehicle tank for storing of aqueous urea solution is preferably intended here. The heating device here comprises an electrical resistance heating trace with a heating side on which in intended use heat is emitted to a fluid to be heated, and a carrier side opposing the heating side, on which the resistance heating trace faces a mounting supporting it, wherein the resistance heating trace is disposed between a flexible film on its heating side and substrate as the supporting mounting on its carrier side, which substrate is more rigid in comparison with the flexible film.

The present invention further relates to a tank, in particular an SCR tank, for storing of aqueous urea solution in a motor vehicle, including such a heating device.

Description of the Related Art

A generic heating device is known, for example, from WO 2008/138960 A1. This publication discloses a flexible heating device, which is disposed between two films or between a film and a flexible plastic layer. In fact due to its flexibility the known flexible heating device can be introduced in different receiving volumes. However, due to its flexibility, the heating device, in particular the sensitive resistance heating trace, is subject to a varying mechanical load, as occurs in vehicles, induced by vibration and shocks, during nearly the entire driving operation. Furthermore due to its flexibility the known flexible heating device can assume different positions and orientations in identical receiving volumes, with the result that different heat transmission behaviors can nonetheless be present in serially produced tanks with identical heating devices accommodated therein.

In fact at one point in its disclosure WO 2008/138960 A1 mentions that known heating devices with a resistance heating trace disposed between two films can be connected to a rigid substrate, but such a connection can only be at points, wherein the films in particular can only be connected to the substrate where no resistance heating trace is provided. Due to the flexible design of the heating device, the heat transmission conditions on the known heating device are different between these connection points over a plurality of embodiments.

From EP 1 473 447 B1 a tank for receiving aqueous urea solution is known wherein an electrical heating device is integrated into the tank wall in a manner not indicated in more detail.

With this last-mentioned known solution the efficiency with which heat can be transmitted from the heating device to the operating fluid can be reduced since the resistance heating trace can be accommodated deep in the interior of the tank and thus a significant thickness of the tank wall must first be heated before heat from the heating device reaches the operating fluid. When due to low external temperatures the operating fluid is undesirably frozen, a thawing process can take an undesirably long time, which can lead to an undesirably long phase of increased pollutant emissions.

SUMMARY OF THE INVENTION

The object of the present invention is therefore to further develop a heating device of the above-described type such that with its always identical operating conditions it can thus be achieved that heat can be quickly transferred from the heating device to the operating fluid.

According to the present invention this object is achieved by a heating device of the above-described type wherein on the carrier side the resistance heating trace is connected to the rigid substrate without intermediate arrangement of a further film.

Since in the presently discussed inventive heating device the resistance heating trace is connected by its carrier side to the rigid substrate without intermediate arrangement of a further film, the resistance heating trace can be fixed by the rigid substrate in a definite position that is always the same for heating devices that are identical in construction. The film on the heating side of the resistance heating trace protects the resistance heating trace from environmental influences, in particular from the possibly chemically aggressive operating fluid.

The film can be connected to the substrate, directly and without intermediate arrangement of a further layer, where no resistance heating trace is provided. For example, the film can be extruded onto or adhered to the substrate.

Furthermore the film can be connected to the rigid substrate by lamination, wherein the lamination time for producing the connection between film and substrate can be shortened by providing an intermediate layer, preferably an intermediate layer made from hardenable material. Such a material can also be provided between the film and the resistance heating trace. In principle the intermediate layer can be hardenable in any manner, for example, by cross-linking, wherein a thermally hardenable intermediate layer is preferred for better control of the hardening process. A hotmelt has proven to be particularly suitable as intermediate material. The thickness of the intermediate layer is preferably on the scale of the thickness of the flexible film and preferably differs from its thickness by no more than 20%.

A material in the sense of the present invention is also thermally hardenable if irreversible cross-linking processes can be initiated in the material by changing the thermal states of the material.

The resistance heating trace can be formed by etching from a flat film or by punching. The resistance heating trace can be formed from aluminum or, for example, from stainless steel, wherein with the use of aluminum as resistance heating trace material an etching method is preferred for forming the specific deign of the resistance heating trace. As a further alternative the resistance heating trace can be manufactured with printing technology using electrically conductive printing-liquid or -paste.

In the context of the substrate in the present application, "rigid" means that in a tile design of 20×20 cm the substrate is essentially dimensionally stable, while the flexible film of the same surface area as the tile is dimensionally unstable.

To increase its surface the resistance heating trace is preferably designed at least partially meandering, i.e., as an elongated trace that is angled a plurality of times in different directions along its extension direction.

The rigid substrate can be configured extensively plate-shaped so that the resistance heating trace can lie on the plate-shaped substrate component and a substrate component section is also provided at that point at which no resistance heating trace exists. For example, the plate-shaped extensive substrate component can completely bridge gaps between adjacent meandering branches of the resistance heating trace.

However, it would also be feasible to provide the rigid substrate as a component only where the resistance heating trace is also provided, so that the substrate as a component shows essentially the same course as the resistance heating trace supported by the substrate. Here the substrate as a rule laterally protrudes beyond the resistance heating trace in order to be able to connect the flexible film not only to the resistance heating trace but also both sides thereof to the substrate.

This last-mentioned embodiment with the substrate following the resistance heating trace in its course can be produced, for example, by overspraying the resistance heating trace in an injection mold. For this purpose the resistance heating trace can initially be applied with its heating side to a side of the flexible film, wherein the film can then serve as carrier film for the further production process. The film can then be introduced together with the resistance heating trace into an injection mold and be fixed there in the usual manner, for example, by vacuum. On the carrier side of the resistance heating trace facing away from the film, substrate material is then sprayed on in a thickness such that a rigid substrate is produced, which is similar in design to the resistance heating trace, so that its course at least sectionally corresponds to that of the resistance heating trace. In this embodiment intermediate spaces between adjacent meandering branches of the resistance heating trace may not or at least not completely be bridged by substrate material.

Due to the generally often changing course direction of the resistance heating trace, if the discussion is about a course direction, it should come down only to a local course direction at a specific site. This course direction of the resistance heating trace and possibly also of the substrate to be supported can deviate from the course direction of the resistance heating trace and possibly of the substrate at another point, for example, because the resistance heating trace, and possibly the substrate between the two points, is curved.

In particular the resistance heating trace can be extensively, in particular fully, applied, adhered, or laminated to an outer surface of the substrate. Furthermore the resistance heating trace can be fixed to the resistance heating trace in a form-fit manner, for example, because substrate material locally encompasses or grips the resistance heating trace. For this purpose the resistance heating trace can include at least one opening, which is penetrated by material of the substrate for connection thereto. However, the material penetrating the resistance heating trace can also comprise a component separate from the substrate and/or a different material from the substrate, for example if plastic rivets are used for connecting the resistance heating trace to the substrate, which, however, is a less-preferred case.

According to a further embodiment it can be provided that the resistance heating trace is received in a depression of the substrate, wherein the depression extends from an outer surface of the substrate down into the depth of the substrate. Here in its course in the substrate, the depression can in turn follow the course of the resistance heating trace so that the depression has at least the width of the receiving resistance heating trace, but for facilitating receiving of the resistance heating trace is preferably configured wider therein and at least sectionally channel-shaped with a channel course that locally corresponds to the course of the received resistance heating trace.

Where adjacent meandering branches of the resistance heating trace lie very close to one another the depression can also be configured to a width such that two or more adjacent meandering arms are received in an more largely formed depression section.

The flexible film can then span the depression on the outer surface of the substrate in order to protect the resistance heating trace from external influences. Here in turn the resistance heating trace can be directly connected by its heating side to the flexible film, possibly by intermediate arrangement of a material such as, for example, the above-mentioned particularly preferred hotmelt.

Alternatively, however, the resistance heating trace can also be disposed at a distance from the film in the depth direction. To dispose the resistance heating trace at the depth suited for the respective heating application, in the depression at least one projection can protrude counter to the depth direction toward the outer surface from a base of the depression delimiting the depression in the depth direction, wherein the resistance heating trace rests on the at least one projection. The projection can preferably be configured as a single piece with the substrate and the depression formed therein or can subsequently be disposed in the depression as a projection component, for example, by adhering or welding. For better heat insulation of the resistance heating trace on its carrier side it can further be provided that the at least one projection is configured hollow so that a gas space is provided by the at least one projection on the carrier side of the resistance heating trace in the region of the supporting. This gas space can serve as an insulating space that impedes heat transfer of the resistance heating trace to the carrier side so that it can be ensured that most of the heat produced by the resistance heating trace is actually emitted to the heating side of the resistance heating trace as desired.

In order to support the heat transfer from the resistance heating trace to the heating surface of the heating device—which the heating side of the resistance heating trace also faces—and simultaneously to best secure the resistance heating trace and protect it well from external influences, the depression can be at least sectionally filled with a hardenable material, i.e., for example, poured. This material is preferably thermally hardenable, wherein for easier introduction into the depression of the substrate the hardenable material preferably differs from the substrate material. The hotmelt already mentioned above has proved to be particularly suited for an at least partial filling of the depression.

Therefore the heating device preferably has at least one gas space on the carrier side of the resistance heating trace, while there is preferably a continuous material thickness without gas spaces on the heating side of the resistance heating trace up to the exposed, heat-emitting heating surface of the heating device.

When the depression is at least sectionally filled with hardenable material then, when the resistance heating trace is disposed at a distance from the outer surface of the substrate, the resistance heating trace is already sufficiently protected from external influences by the hardenable material filled into the depression, for example, from contact with an aggressive operating fluid, such as, for example, aqueous urea solution. In this case the flexible film can be omitted without replacement so that the heating device then only comprises: a substrate having a depth extending in the depth direction of the substrate emanating from an outer surface thereof and a resistance heating trace received in the depression such that its heating side is provided at a distance in the depth direction from the outer surface of the substrate, wherein at least that section of the depression that is located between the heating side of the resistance heating trace and the outer surface of the substrate is filled with hardenable material as mentioned above.

The substrate can be a thermoplastic material that can be shaped by an injection-molding method. Here polyolefins in particular have proved themselves as thermoplastic material, wherein polypropylene is preferred as a thermoplastic material.

However, it should not be excluded that a duroplast is used as substrate material, which, for example, can be brought to harden in a known manner, for example, after prior molding.

Here a plate-shaped semi-finished product can be used as a pre-polymer, which is moldable and which can be shaped in a desired three-dimensional form together with the resistance heating trace and optionally the flexible film and then hardened.

The substrate can also be shaped in a desired three-dimensional form independently of the resistance heating trace—for example, by thermoforming or by injection molding—and after the casting or reshaping of the substrate the resistance heating trace is applied to the finished shaped substrate, for example again by one or more of the above-mentioned connecting methods (adhering, laminating, form-fit connecting, and the like).

Since on its heating side the resistance heating trace emits heat to the external environment via its surface, the resistance heating trace is preferably a flat structure extending in a main extension surface. In principle the dimension of the resistance heating trace in the thickness direction is preferably significantly smaller than the dimension of the resistance heating trace in a course direction orthogonal to the thickness direction and in a width direction orthogonal to both the thickness direction and to the course direction.

For particularly effective heating of tank volumes the main extension surface is preferably a three-dimensional surface, i.e., a surface that is curved about at least one axis of curvature. The forming of a resistance heating trace with a three-dimensional main extension surface as well as a substrate carrying this resistance heating trace has already been described above. However, the main extension surface can also be flat.

The present invention also relates to a tank, in particular an SCR tank for storing of aqueous urea solution, including a heating device according to one of the preceding claims.

According to a first embodiment of the tank of the present invention the substrate can be formed separately from the tank wall and be received in the interior of the tank with spacing from the tank wall. Preferably the substrate is disposed at a distance from the tank wall to form a gap space between the tank wall and the substrate. Particularly preferably the gap dimension of the gap space is at least sectionally approximately 2 to 15 mm. The largest part of the gap space preferably lies in this gap-dimension range.

Alternatively, however, it can also be feasible to use the tank wall itself as the substrate so that the above embodiments made for the substrate relate to the tank wall itself, which, for example, can be formed by injection-molding, for example, as a partial shell of the tank.

BRIEF DESCRIPTION OF THE DRAWING FIGURES

The present invention is explained in more detail below with reference to the accompanying drawings.

Figure 2:
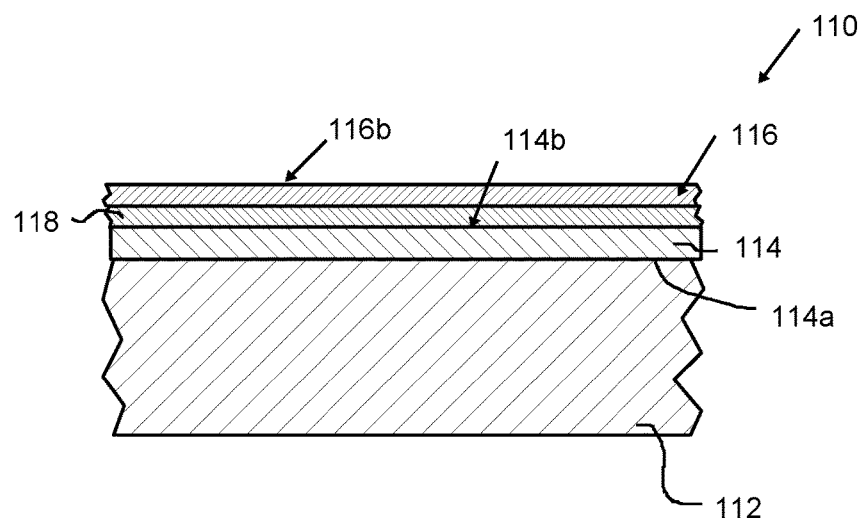
Figure 3:
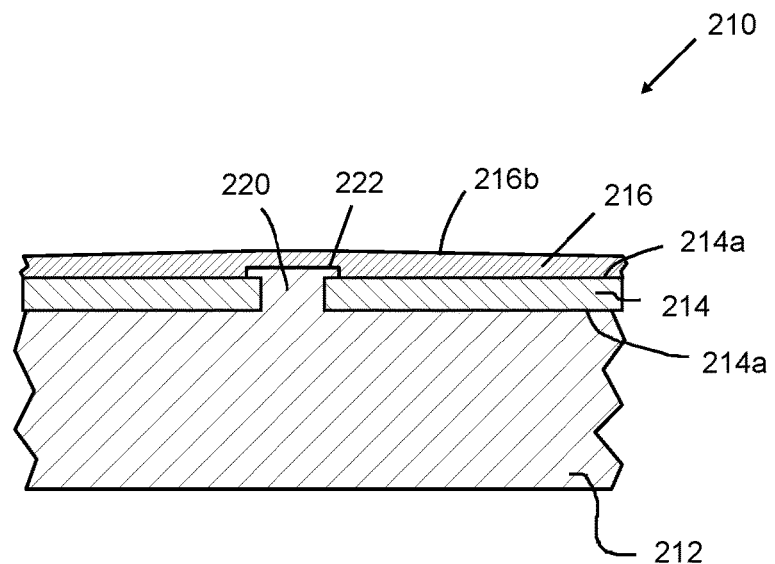
Figure 4:
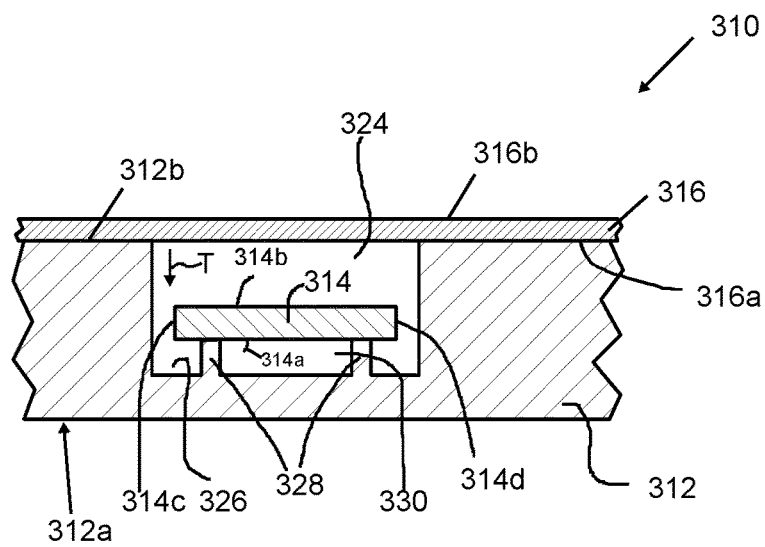
Figure 5:
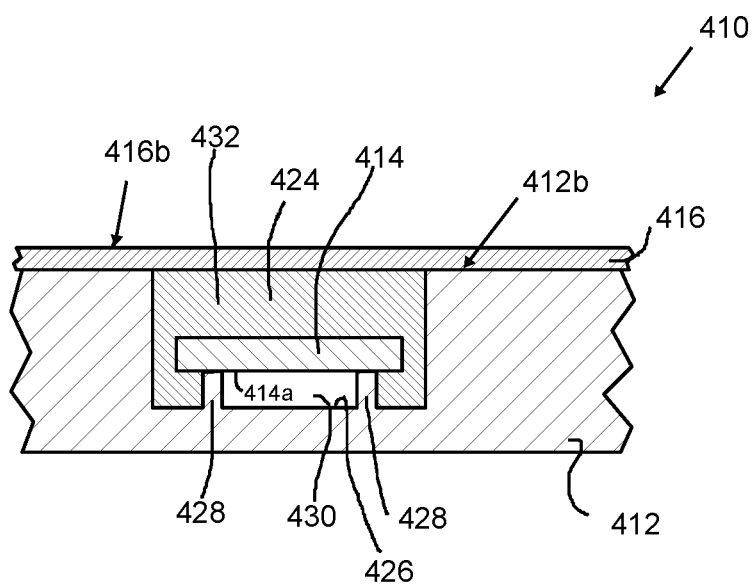
Figure 6:
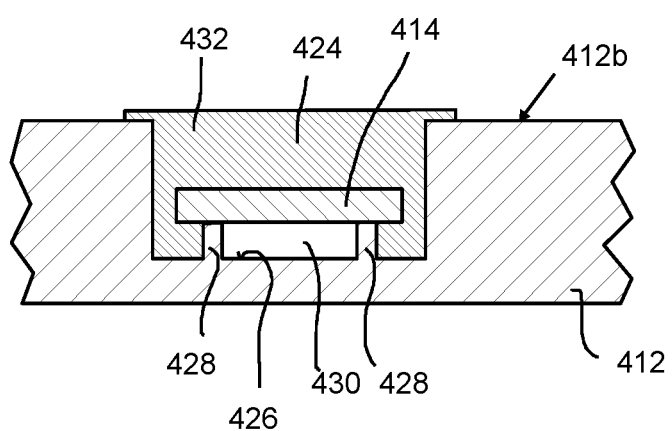

FIG. 1 depicts a cross-sectional view through a first embodiment of an inventive heating device, FIG. 2 depicts a cross-sectional view through a second embodiment of an inventive heating device, FIG. 3 depicts a cross-sectional view through a third embodiment of an inventive heating device, FIG. 4 depicts a cross-sectional view through a fourth embodiment of an inventive heating device, FIG. 5 depicts a cross-sectional view through a fifth embodiment of an inventive heating device, and FIG. 6 depicts a variation of the embodiment of FIG. 5.

DETAILED DESCRIPTION OF THE PREFERRED EMBODIMENTS

In FIG. 1 a first embodiment of an inventive heating device is generally indicated by 10. This comprises an essentially rigid substrate 12, on which a resistance heating trace 14, made for example from metal, is applied, over which in turn a plastic film 16 that is flexible in comparison with the rigid substrate 12 is disposed.

In FIG. 1 the section through the resistance heating trace 14 extends along the local direction of extension of the resistance heating trace 14 so that an edge thereof extends parallel to the sectional plane of the drawing plane of FIG. 1 and extends in the width direction of the edge opposite the width direction of the resistance heating trace 14 behind the drawing plane of FIG. 1.

The resistance heating trace 14 can be simply placed on the substrate 12 and indirectly connected to the substrate by the flexible film 16. For this purpose the flexible film 16 can be connected to the substrate 12, for example, by lamination. In the case of sufficiently compatible materials of substrate 12 and film 16 it can also be extruded out onto the substrate 12. In this case, where no resistance heating trace 14 extends, the film 16 is connected directly to the substrate 12 so that the resistance heating trace 14 of the embodiment of FIG. 1 lies with its carrier side 14a on the substrate 12 and can be enclosed on three sides, including also on its heating side 14b opposite the carrier side 14a, by the flexible plastic film 16.

The resistance heating trace 14 can alternatively also be embedded in the substrate 12 and enclosed on three sides, i.e., on its carrier side 14a and on its two edges by substrate 12, and only covered on its heating side 14b by the film 16.

A mixed form is also conceivable wherein the resistance heating trace 14 is only sunk with a part of its material thickness D on its carrier side 14a into the substrate 12, so that a part of the resistance heating trace 14 closer to the substrate 12, including the carrier side 14a, is enclosed on three sides by substrate material and a part of the resistance heating trace more distant from the substrate 12, including the heating side 14b, is surrounded on three sides by the plastic film 16.

On its heating surface 16b the heating device 10 emits heat to a medium wetting of the heating surface 16b. Preferably here the wetting medium in question is aqueous urea solution.

The stiffness of the substrate 12 in comparison with the flexibility of the plastic film 16 is based not only on the appropriate choice of material but above all on appropriate component dimensioning. Therefore the substrate 12—depending on the respective choice of material—is generally made significantly thicker than the flexible film 16.

When the resistance heating trace 14 is disposed on the essentially rigid substrate 12, with serially produced components, the resistance heating trace 14 is always identically located, with the result that all embodiments of one and the same heating device offer essentially the same heating characteristics.

Furthermore the mechanical load on the resistance heating trace is reduced since the resistance heating trace 14 disposed on the rigid substrate 12 cannot be bent in opposing directions by vibrations regularly occurring in operation of the vehicle and thus cannot be alternatingly stressed.

In FIG. 2 an alternative second embodiment of the inventive heating device is depicted wherein identical and functionally identical components and component sections are provided in the second embodiment with the same reference numbers as in the first embodiment, but increased by the number 100.

The second embodiment is explained below only insofar as it differs from the above-described first embodiment, to whose description reference is also explicitly made for explanation of the second embodiment.

For simplification of the connection of the flexible plastic film 116 to the substrate 112 an intermediate layer 118 made from a hardenable material is provided between the flexible plastic film 116 and the substrate 112. This hardenable material is also provided between the plastic film 116 and the resistance heating trace 114.

Although the hardenable material of the intermediate layer 118 can be any hardenable material, according to current knowledge a hotmelt is used for this purpose, sometimes also referred to in German usage as "Heizleim."

The resistance heating trace 114 can be wetted not only on the heating side 114b by the hardenable material of the intermediate layer 118, but can also be wetted by this material on its two edges located in front of or behind the drawing plane of FIG. 2.

In FIG. 3 a third embodiment of an inventive heating device is depicted. The view of FIG. 3 on the sectioned heating device corresponds to that of FIGS. 1 and 2.

Components and component sections identical and functionally identical to those in the first embodiment are provided with the same reference numbers in the third embodiment, but increased by the number 200.

Below the third embodiment is described only insofar as it differs from the first embodiment, to whose description reference is otherwise explicitly also made for explanation of the third embodiment.

In the embodiment of the heating device 210 of FIG. 3 the resistance heating trace 214 is connected to the substrate 212 in a form-fit manner. For this purpose the resistance heating trace 214 can include one or more openings 220 that are penetrated by a material that is connected the substrate 212, preferably connected as a single piece. The material penetrating the opening 220 of the resistance heating trace 214 preferably grips the resistance heating trace 214 on the heating side 214a, for example by the T-shaped formation of a fixing head 222 shown in FIG. 3.

The embodiment of FIG. 3 can additionally be provided with an intermediate layer 218 as is depicted in FIG. 2 as intermediate layer 118.

The plastic film 216 is simply applied via mechanical fixing by the fixing head 222, so that in the region of the fixing head 222 a slightly elevated heating surface forms compared with film regions over the resistance heating trace 214 that are located farther away from the fixing head 222.

In FIG. 4 a fourth embodiment of the inventive heating device is shown wherein identical and functionally identical components in the forth embodiment are provided with the same reference numbers as in the first embodiment, but increased by the number 300.

The fourth embodiment is explained below only insofar as it differs from the above-described first embodiment to whose description reference is also explicitly made for explanation of the fourth embodiment.

In the fourth embodiment shown in FIG. 4 the sectional plane through the heating device 310 is rotated by 90° with respect to the previously depicted views of FIGS. 1 to 3, that is in FIG. 4 the direction of extension of the resistance heating trace 314 is orthogonal to the drawing plane of FIG. 4, and not, as in the preceding FIGS. 1 to 3, parallel thereto.

Proceeding from its outer surface 312b facing the heating side 316b the substrate 312 has a depression 324 protruding into the substrate 312 in depth direction T, which depression 324, however, does not completely penetrate the substrate 312 in depth direction T. The depression 324 extends at least sectionally essentially collinear with the resistance heating trace 314 received therein.

The side walls of the depression 324 can contact the edges 314c and 314d of the resistance heating trace 314 or, as depicted in FIG. 4, may be spaced apart from the latter.

At the base 326 of the depression 324, one or more projections 328 can protrude in the direction opposite the depth direction T, to which the resistance heating trace 314 is applied and optionally fixed, for example by an intermediate adhesive layer.

A gas space 330 is preferably located on the carrier side 314a in the interior of a projection 328, which gas space 330 serves to isolate the resistance heating trace 314 with respect to the substrate base surface 312a opposing the outer surface 312b or also the heating surface 316b.

In the present case the resistance heating trace 314 is disposed in the depression 324 with a spacing in depth direction T with respect to the outer surface 312b, from which the depression 324 is introduced into the substrate 312. Deviating from this, however, the resistance heating trace 314 can directly contact via its heating side 314b the side 316a of the plastic film 316 facing it.

In FIG. 5 a fifth embodiment of the inventive heating device is shown, wherein identical and functionally identical components in the forth embodiment are provided with the same reference numbers as in the fourth embodiment, but increased by the number 100.

The fifth embodiment is explained below only insofar as it differs from the above-described fourth embodiment to whose description reference is also explicitly made for explanation of the fourth embodiment.

The fifth embodiment of FIG. 5 only differs from that of FIG. 4 in that the depression 424, with exception of the at least one gas space 430, is filled by a hardenable material 432, for example again with a hotmelt. In this way the resistance heating trace 414 can be optimally fixed in the substrate 412 and protected from external influences. In addition, with appropriate choice of the material 432, heat conduction through the material 432 to the heating surface 416b is subject to less resistance than if heat would have to be transferred from the resistance heating trace 414 to the heating surface 416b via a gas space.

The filling material 432 preferably terminates flush with the outer surface 412b of the substrate 412 so that the plastic film can be applied to a stepless base.

"Gas space" is also understood to mean a substantially evacuated gas space, although the gas space is usually formed by normally prevailing atmospheric pressure and continues to contain the latter.

The embodiment of FIG. 5 can be modified to the effect that due to the filling of the depression 424 with the material 432, in particular with hotmelt, the plastic film 416 for protecting the resistance heating trace 414 from contact with aggressive media, such as, for example, aqueous urea solution, is unnecessary.

Such a modified embodiment is shown in FIG. 6. In the embodiment of FIG. 6 the filling material 432 projects slightly over the outer surface 412b of the substrate 412. However, this need not be the case. Also in the embodiment of FIG. 6 the filling material 432 can terminate flush with the outer surface 412b of the substrate 412.

The resistance heating trace can be connected in the usual manner to an electrical energy source in a contact region of the heating element.

The substrate can be disposed in a tank as a substrate separate from a tank wall, preferably with spacing from the tank inner wall, in order to heat a medium received in the tank interior.

Alternatively the substrate 412 can be the tank wall itself.

The invention claimed is:

1. A heating device for heating an operating liquid of a motor vehicle, the heating device comprising:
   an electrical resistance heating trace with a heating side on which in intended operation heat is emitted to the operating liquid to be heated, and with a carrier side opposing the heating side on which the resistance heating trace faces a mounting supporting it,
   wherein the resistance heating trace is disposed between a flexible film on its heating side and a substrate rigid in comparison with the flexible film as the supporting mounting on its carrier side,
   wherein the resistance heating trace is connected to the rigid substrate on the carrier side without intermediate arrangement of a further film,
   wherein the heating device has at least one gas space on the carrier side of the resistance heating trace;
   wherein the resistance heating trace is received in a depression of the substrate, wherein starting from an outer surface of the substrate the depression extends into the substrate in a depth direction thereof and follows the course of the resistance heating trace orthogonally to the depth direction;
   wherein at least one projection from a base delimiting the depression in the depth direction, extends counter to the depth direction to the outer surface wherein the resistance heating trace rests on the at least one projection; and
   wherein the at least one projection is hollow so that the at least one gas space is provided on the carrier side of the resistance heating trace in the region of support by the at least one projection.

2. The heating device according to claim 1, wherein an intermediate layer made from hardenable material is provided on the heating side of the resistance heating trace between the film and the resistance heating trace.

3. The heating device according to claim 1, wherein the rigid substrate extends as a flat component over a continuous extension surface.

4. The heating device according to claim 1, wherein the rigid substrate as a component extends only in regions in which the resistance heating trace is provided.

5. The heating device according to claim 1, wherein the depression is filled at least sectionally with a hardenable material.

6. The heating device according to claim 1, wherein the resistance heating trace at least in a section is provided distant in the depth direction from the outer surface of the substrate.

7. The heating device according to claim 1, wherein the substrate comprises a thermoplastic material.

8. The heating device according to claim 1, wherein an intermediate layer made from thermally hardenable material is provided on the heating side of the resistance heating trace between the film and the resistance heating trace.

9. The heating device according to claim 1, wherein an intermediate layer made from hotmelt is provided on the heating side of the resistance heating trace between the film and the resistance heating trace.

10. The heating device according to claim 1, wherein the rigid substrate as a component follows the resistance heating trace in its course and projects over it on first and second sides orthogonal to a local course direction.

11. The heating device according to claim 1, wherein the depression is filled at least sectionally with a thermally hardenable material.

12. The heating device according to claim 1, wherein the depression is filled at least sectionally with hardenable material different from the substrate material.

13. The heating device according to claim 1, wherein the depression is filled at least sectionally with hotmelt.

14. The heating device according to claim 1, wherein the substrate comprises a polyolefin.

15. The heating device according to claim 1, wherein the substrate comprises at least one of polypropylene and a duroplast.

16. The heating device according to claim 1, wherein the resistance heating trace includes a flat structure extending in a main extension surface, whose dimension in a thickness direction is smaller than its dimension in an extension direction orthogonal to the thickness direction and in a width direction orthogonal both to the thickness direction and to the extension direction.

17. The heating device according to claim 16, wherein the main extension surface is a three-dimensional surface.

18. A tank including a heating device according to claim 1.

19. The tank according to claim 18, wherein the substrate is received in an interior of the tank at a distance from a tank wall.

20. The tank according to claim 18, wherein a tank wall is formed by the substrate.

21. The tank according to claim 18, wherein the tank is an SCR tank for storage of the operating liquid, and the operating liquid is an aqueous urea solution.

22. The tank according to claim 18, wherein the substrate is received in an interior of the tank at a distance from a tank wall, forming a gap space between the tank wall and the substrate.

23. The tank according to claim 22, wherein the gap space between the tank wall and the substrate has a gap dimension of 2 to 15 mm.

* * * * *